United States Patent [19]

Bowyer et al.

[11] 4,261,579
[45] Apr. 14, 1981

[54] SHOCK WAVE TRIGGERED TARGET INDICATING SYSTEM

[75] Inventors: William H. Bowyer, Farnham; Robert Newnham, Poole, both of England

[73] Assignee: Australasian Training Aids (Pty.), Ltd., Albury, Australia

[21] Appl. No.: 43,807

[22] Filed: May 30, 1979

[30] Foreign Application Priority Data

May 30, 1978 [GB] United Kingdom ............... 24252/78

[51] Int. Cl.³ ................................................ F41J 5/06
[52] U.S. Cl. .................................... 273/372; 273/406; 310/335; 367/902; 367/906
[58] Field of Search ............................ 273/372; 35/25; 310/322, 334, 335, 340, 341, 344, 345, 346; 367/902, 906

[56] References Cited

U.S. PATENT DOCUMENTS

| | | | |
|---|---|---|---|
| 2,527,217 | 10/1950 | Hayes | 310/334 X |
| 3,160,415 | 12/1964 | Knapp | 273/372 |
| 3,287,692 | 11/1966 | Turner | 310/334 |
| 3,387,604 | 6/1968 | Erikson | 310/335 X |
| 3,445,808 | 5/1969 | Johnson | 367/906 X |
| 3,489,413 | 1/1970 | Groder et al. | 273/372 |
| 3,531,764 | 9/1970 | Hill | 367/902 X |
| 3,707,699 | 12/1972 | Sanctuary | 273/372 |
| 3,836,953 | 9/1974 | Rotier | 367/902 X |

Primary Examiner—Anton O. Oechsle
Attorney, Agent, or Firm—Schwartz, Jeffery, Schwaab, Mack, Blumenthal & Koch

[57] ABSTRACT

To determine the position of a bullet relative to a target an array of at least six transducers is provided, the transducers being in two parallel rows of three in a common plane. The instants of detection of the shock wave generated by the bullet are measured and the position of the bullet is calculated from the measured values.

15 Claims, 16 Drawing Figures

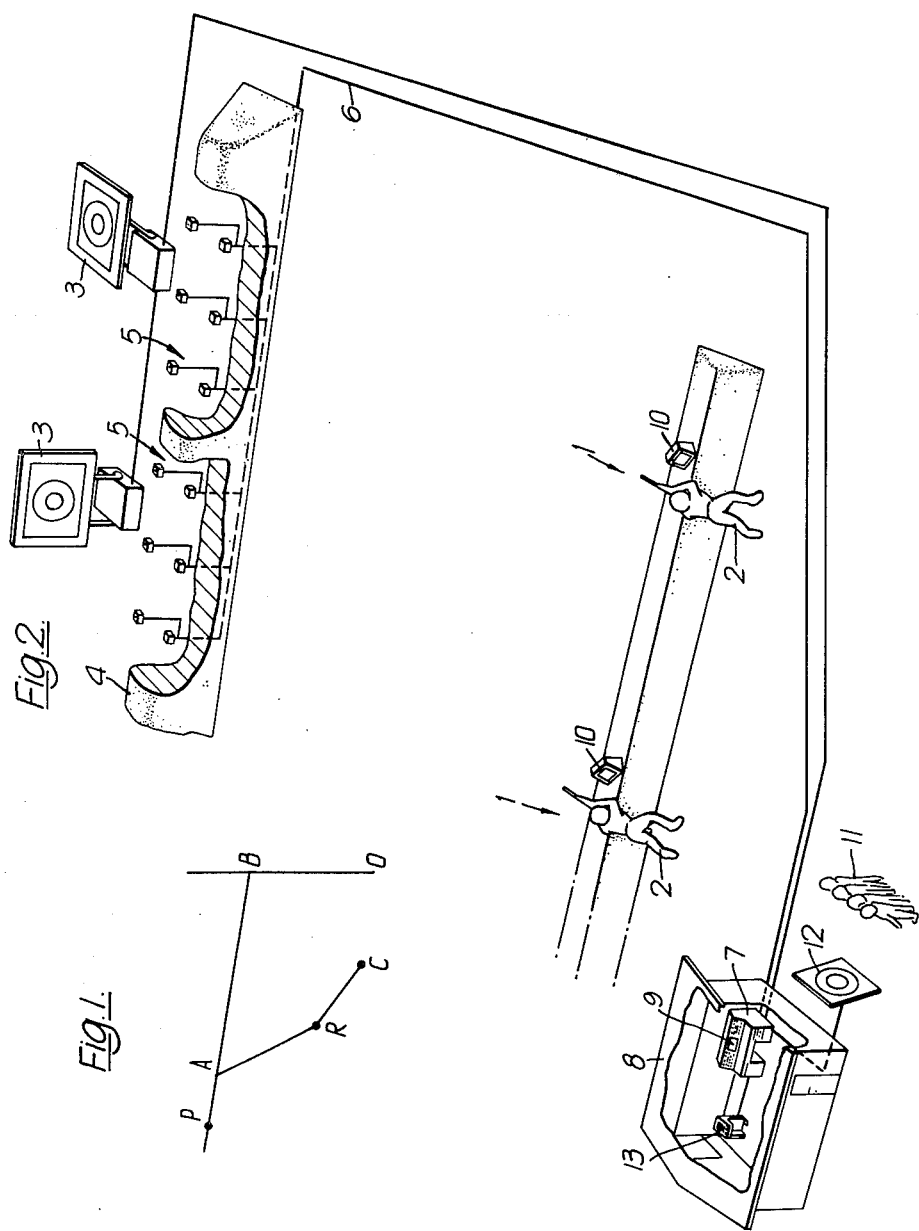

SHOCK WAVE TRIGGERED TARGET INDICATING SYSTEM

BACKGROUND OF THE INVENTION

The present invention relates to an apparatus for determining information concerning the trajectory of a supersonic projectile passing through a predetermined area, said apparatus comprising transducers to be located adjacent said predetermined area and means to calculate, from the signals generated by the transducers, information concerning the trajectory of a passing projectile.

When a projectile travels through the atmosphere with a speed faster than the speed of sound, namely at a supersonic speed, the projectile generates a conically expanding pressure or shock wave, the projectile being at the apex of the shock wave, and the shock wave subsequently expanding conically away from the trajectory of the projectile.

It has been proposed to provide apparatus to determine the position of the trajectory of a projectile with an apparatus in which transducers or the like are utilised to detect such a shock wave generated by a supersonic bullet or projectile. One such proposal is described in the U.S. Pat. No. 3,778,059 (Rohrbaugh) and in the apparatus disclosed in this Specification two metal rods are located respectively adjacent the base and one side edge of the target, there being acoustic transducers attached to the ends of the rods. When a bullet is fired at the target the shock wave generated by the bullet will impinge on the rods, and a resultant acoustic wave or vibration generated within the rods will be transmitted to the transducers at the ends of the rods which subsequently produce electric signals. The resultant signals are fed to a timing and calculating device which calculates the position of the trajectory of the bullet and permits the position at which the bullet hits the target to be displayed on a device such as a visual display unit or cathode ray tube.

One disadvantage of this proposal is that the rod adjacent the side edge of the target is exposed, and can be damaged if accidentally hit by a shot fired at the target.

A further prior proposal is disclosed in U.S. Pat. No. 2,925,582 (Mattei) and this Specification discloses the use of four transducers placed around the periphery of a target area, signals derived by the four transducers when a bullet is fired at the target being fed to an appropriate calculating and display device adapted to calculate and display the position of the bullet. The calculating device initially determines the duration of the shock wave detected by each transducer, since the duration of the shock wave increases with increasing distance from the origin of the shock wave. Signals representative of the durations of the shock wave control the beam scanning circuit of a display device. This prior proposed arrangement suffers from the disadvantage that at least three of the transducers are exposed to fire from the marksman and are thus susceptible to damage. Furthermore the levels of accuracy obtainable with the system described in this U.S.A. Patent Specification are not very high.

It will be appreciated that the prior art discussed above discloses the general use of transducers to detect airborne shock waves generated by a projectile such as a bullet, but all the prior proposed arrangements suffer from either the disadvantage that the arrangement does not provide an accurate indication of the precise position of the bullet or the disadvantage that the transducers are in a position in which they may be damaged by bullets hitting the transducers.

The present invention seeks to provide an improved target range in which the above described disadvantages are obviated or reduced.

SUMMARY OF THE INVENTION

According to the broadest aspect of this invention there is provided an apparatus for determining the position of the trajectory of a supersonic projectile passing through a predetermined area relative to a predetermined target, said apparatus comprising a plurality of transducers located adjacent the predetermined area in two substantially linear rows, the rows being arranged in a common plane, each row comprising at least three transducers, means to determine the instants of reception by the transducers of the shock or pressure wave generated by the projectile by the transducers and means to calculate, from the determined information, the position of the trajectory relative to the target.

Preferably the transducers are arranged in two parallel rows, the transducers being substantially evenly spaced, although the spacing between the transducers may vary.

Preferably the transducers are arranged in two parallel rows, and most conveniently the transducers in the rows are co-aligned with each other. The plane containing the transducers may be horizontal, vertical or inclined.

Preferably the transducers are located adjacent the lower side edge of the target and are shielded from the firing point by means which the projectiles cannot penetrate, such as an earthwork.

Preferably means are provided for measuring either the speed of sound in air in the region of the target or parameters which determine the speed of sound in air in the region of the target, output signals from said measuring means being supplied to said calculating means.

In one embodiment of the invention the speed of sound in air is measured by generating a pulse of sound and by measuring the time taken for the pulse of sound to traverse a known distance. In alternative embodiments of the invention means are provided for measuring the temperature and relative humidity of the air in the region of the target, since these two parameters are the parameters which largely determine the speed of sound in air. Other parameters only have a very minor influence on the speed of sound in air.

Preferably means are provided for measuring the effect of wind in the region of the target area. Such means may comprise a source of sound and one or more transducers adapted to detect sound generated by said source of sound, said calculating means being adapted to calculate, from signals received by said transducer or transducers the effect of wind in the region of the target.

Preferably each transducer comprises a disc shaped member of piezo-electric material having a diameter of five mm or less.

Preferably each transducer comprises a member of rigid material for transmitting said airborne shock or pressure wave to a piezo-electric member in firm contact with the base of the member, the member of rigid material having a convex surface exposed to a shock wave. Preferably said convex surface is hemispherical.

Preferably each transducer comprises a member of insulating material having a recess to accommodate a disc of piezo-electric material having conductive coatings on two opposed faces thereof and channel accommodating conductive wires connected to said coatings, the base of said hemi-spherical member being secured to the piezo-electric disc. Conveniently each transducer is mounted in such a way as to be acoustically decoupled from the member or members supporting the transducer.

Preferably means are provided for amplifying the signal produced by each transducer, said amplifying means comprising an initial amplifying means and a threshold comparator which only passes signals having a predetermined minimum value.

Preferably a clock signal generator is provided to provide successive signals representative of successive instants of time, latches being provided adapted to store the signal generated by the clock signal generator at the instant that the latch receives the signal from an associated transducer, means being provided to provide a signal indicative of each latch, means being provided to transfer signals from each latch and means providing a signal indicative of that latch to a buffer, and means being provided for transferring signals from said buffer to a computer memory when the memory is able to accept the signals.

Preferably the computer is adapted to control the display of information on a visual display unit and a cathode ray scanning camera is provided to generate a display signal from a visual image of the target and means are provided to detect when a portion of the target image corresponding to the calculated position of the projectile is being displayed and for inverting or otherwise modifying the display signal at that instant.

The target utilised in any embodiment of the invention may be a fixed target or may be a target adapted to be moved from a concealed position to a visible position and vice versa.

In one embodiment of the invention the transducers and target may be mounted on a trolley which can move along a predetermined track.

In an embodiment of the invention the transducers may be mounted on any apparatus supporting or mounting the target, or may be mounted in front of the target or any other suitable device.

BRIEF INTRODUCTION TO THE DRAWINGS

In order that the invention may be more readily understood and so that further features thereof may be appreciated, the invention will now be described by way of example with reference to the accompanying drawings in which:

FIG. 1 is a diagrammatic representation of a trajectory of a bullet approaching a target illustrating the path taken by part of a conical pressure or shock wave generated by the bullet for purposes of a mathematical explanation;

FIG. 2 is a perspective view of a range utilising apparatus in accordance with the present invention;

DESCRIPTION OF PREFERRED EMBODIMENT

Figure 3:
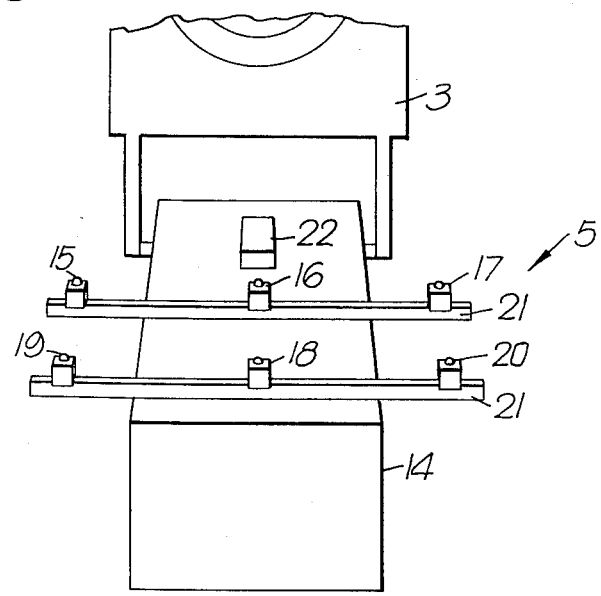
FIG. 3 is a front view of a target moving mechanism provided with a transducer array forming part of an apparatus in accordance with the invention.
Figure 4:
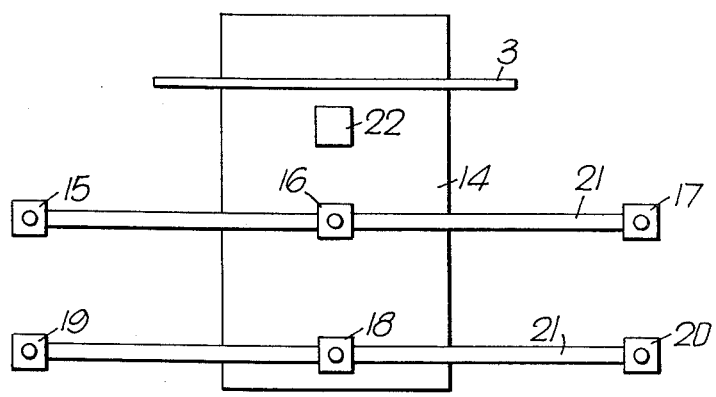
FIG. 4 is a top plan view of the apparatus shown in FIG. 3.

To facilitae an understanding of the invention the following description commences with a mathematical description of the shock wave generated by a supersonic projectile such as a bullet.

Referring to FIG. 1 a bullet travels along the trajectory PAB, eventually striking the target at B, whose co-ordinates are to be found.

The shock wave which eventually triggers the sensor at C initiates at point A on the bullet trajectory.

P is the position of the bullet when a timing period is started, i.e. P represents an arbitrary origin of timing.

O, a point in the target plane, is the origin of our co-ordinate system.

Now let the total time for the signal to reach C from P to t; t being made up of the time taken for the bullet to reach A and the time taken for the shock wave to reach C from A. Let these be $t_1$ and $t_2$ respectively.

We can regard the shock wave motion generated at any specific instant as being a spherical expanding wave front in moving air. In time interval $t_2$, the centre of the spherical disturbance has moved from A to R due to the effect of wind, while the disturbance has expanded to radius RC. Now let $V_b$ be the velocity of the bullet
W be the wind velocity
$V_s$ be the speed of sound
and let
$t_2 = \lambda t$
$t_1 = (1 - \lambda t)$
With these definitions, and using FIG. 1, we see that $$A = P + V_b(1-\lambda)t \qquad (1)$$

$$R = A + W\lambda t \qquad (2)$$

and $$C - R = V_s \lambda t \qquad (3)$$

Hence $$(C-R)^2 = V_s^2 \lambda^2 t^2 \text{ from} \qquad (3)$$

and substituting for R using equations (1) and (2) gives $$(C - P - V_b(1-\lambda)t - W\lambda t)^2 - V_s^2 \lambda^2 t^2 = 0 \qquad (4)$$

Now let $$U = V_b - W \qquad (5)$$

and $$Q = P - C \qquad (6)$$

so that equation (4) becomes $$(U\lambda t - (Q + V_b t))^2 - V_s^2 \lambda^2 t^2 = 0 \qquad (7)$$

The shock wave which actually triggers the sensor C will be the one which reaches sensor C first, i.e. the one for which t from equation (7), is a minimum. The value of $\lambda$ for this shock wave is obtained by differentiating equation (7) with respect to $\lambda$ and putting $\delta^t = 0/\delta\lambda$ for a minimum.

This gives $$2(u\lambda t - (Q + V_b t)) \cdot ut - 2V_s^2 \lambda t^2 = 0 \qquad (8)$$

Or $$\lambda t = \frac{(Q + V_b t) \cdot u}{(u^2 - V_s^2)}$$

Now let $u^2 - V_s^2 = \gamma$ so that $$\lambda = \frac{(Q + V_b t) \cdot u}{\gamma t} \qquad (9)$$

and, substituting for $\lambda$ in equation (7)

$$\{(Q \cdot U + t(V_b \cdot u))u - \gamma(Q + V_b t)\}^2 - V_s^2(Q \cdot u + t(V_b \cdot u))^2 = 0$$

Or $$(Q \cdot u + (V_n \cdot u)t)^2 u^2 + \gamma^2(Q + V_b t)^2 - 2\gamma(Q \cdot u + t(V_b \cdot u))(u(Q + V_b t)) - V_s^2(Q \cdot u + t(V_b \cdot u))^2 = 0 \qquad (10)$$

Now, collecting terms in $(Q \cdot u + t(V_b \cdot u))^2$ $$(Q \cdot u + t(V_b \cdot u))^2 \{u^2 - 2\gamma - V_s^2\} + \gamma^2(Q + V_b t)^2 = 0$$

and since $u^2 - 2\gamma - V_s^2 = -\gamma$.

$$\gamma(Q + V_b t)^2 - (Q \cdot u + t(V_b \cdot u))^2 = 0 \qquad (11)$$

Now we have that $$Q = P - C$$

and we know that, since P and B are both on the bullet trajectory, $$B = P + \tau V_b$$

Hence $$Q = B - C - \tau V_b \qquad (12)$$

and substituting (12) into equation (11) gives $$\gamma(B - C + V_b(t-\tau))^2 - (B \cdot u - C \cdot u + (t-\tau)(V_b \cdot u))^2 = 0 \qquad (13)$$

Equation (13) relates the time of arrival of the shock wave at a sensor C, to the position of the sensor and the co-ordinates of the bullet hit position in the target plane.

A similar equation will hold for each of the sensors in the array, and sufficient sensors will allow equation (13) to be solved for the various unknowns (bullet coordinates, wind velocity vector, bullet velocity vector, $\tau$ etc).

In practice iterative methods will be adapted for solving the equations. The basis for the iterative procedure will again be the Newton-Raphson technique.

When wind is taken into account there are more unknowns and thus more items of input data have to be available to enable the position of the projectile to be determined. When solving simultaneous equations there have to be as many equations as there are unknowns, and thus a large number of time differences have to be measured if accurate results are to be obtained.

The foregoing mathematical analysis is based on the assumption that the bullet travels with a constant velocity. Of course, as a bullet travels through the atmosphere the bullet decelerates due to the retarding effect of the atmosphere. For any particular type of ammunition the deceleration experienced by a bullet is substantially constant and depends upon the velocity of the bullet, and consequently it is possible to program the computer to take into account the effect of the deceleration provided that the computer is advised of the particular type of ammunition that is being utilised.

The following mathematical analysis is offered by way of explanation, the situation when deceleration of the bullet is taken into account. Again reference is made to FIG. 1 of the accompanying drawings.

As before, we have that the total time t to reach C from P is given by $$t = t_1 + t_2$$

$$\therefore t = \lambda t + (1-\lambda)t$$

For bullets at constant speed, $$V_b(1-\lambda)t = A - P$$

Let us suppose now that we have a bullet which decelerates according to the equation.

$$dv/dt = -KV^2 \qquad (1)$$

i.e. the rate of deceleration is directly proportional to square of the speed. Thus $$\frac{dv}{dt} \bigg/ \frac{ds}{dt} = -KV^2 \bigg/ \frac{ds}{dt}$$

and since $$ds/dt = V$$

$$dv/ds = -KV$$

whence $$V = V_b e^{-KS} \qquad (2)$$

The time taken for the bullet to travel from P to A is thus given by $$(1-\lambda)t = \int_P^A \frac{ds}{V} = \frac{1}{V_b} \int_P^A e^{KS} ds = \frac{1}{KV_b}[e^{KS}]_P^A = \frac{1}{KV_b}(e^{K(A-P)} - 1) \quad (5)$$

Hence $$A = P + I \cdot 1/K \log[KV_b(1-\lambda)t + 1] \quad (3)$$

where I is the unit vector in the bullet trajectory.

This equation 3 is the analogue of equation (1) in the previous derivation.

Equation (4) of the previous derivation thus becomes $$(C-P-I/K \log\{KV_b(1-\lambda)t+1\} - W\lambda t)^2 - V_s^2 \tau^2 t^2 = 0 \quad (4)$$

Now let $$KV_b(1-\lambda)t = \mu$$

Experience tells us that $\mu$ is small for realistic bullet decelerations.

Hence $$\log(1+\mu) = \mu - \mu^2/2 \quad (5)$$

As before let $$\left.\begin{array}{l} U = (V_b - W) \\ Q = P - C \end{array}\right\} \quad (6)$$

and then making the necessary transformations we obtain the analogue of original equation (7)

$$\{u\lambda t - (Q+V_b t) + Iu^2/2K\}^2 - V_s^2(\lambda t)^2 = 0 \quad (7)$$

Now $$\frac{Iu^2}{2K} = \frac{KV_b^2(1-\lambda)^2 t^2}{2} I$$

$$\left\{ u^2\lambda^2 t^2 + (Q+V_b t)^2 + \frac{u^4}{4K^2} + 2u\lambda t I \frac{u^2}{2K} - 2U\lambda t(Q+V_b t) - 2\frac{Iu^2}{2K}(Q+V_b t) \right\} - V_s^2\lambda^2 t^2 = 0$$

Collecting terms in $\lambda t$ $$(\lambda t)^3 \{+ Ku \cdot IV_b^2\} +$$
$$(\lambda t)^2 \{u^2 - 2utIKV_b^2 - I \cdot (Q+V_b t)KV_b^2 - V_s^2\} +$$
$$\lambda t \left( u \cdot I \cdot \frac{KV_b^2 t^2}{2} - 2\mu(Q+V_b t) + 2(Q+V_b t)I \cdot tKV_b^2 \right) +$$
$$\left( (Q+V_b t)^2 2I(Q+V_b t) \frac{KV_b^2 t^2}{2} \right) = 0$$

Hence equation (7) can be rewritten in the form $$AX^3 + BX^2 + CX + D = 0 \quad (8)$$

where $$X = \lambda t$$

$$A = KV_b(V_b \cdot \mu)$$

$$B = u^2 - KV_b(V_b \cdot (Q+V_b t) - 2KV_b t(V_b \cdot u) - V_s^2$$

$$C = -2(Q+V_b t) \cdot u + KV_b t^2(V_b \cdot u) + 2KV_b V_b(Q+V_b t)$$

$$D = (Q+V_b t)^2 - KV_b t^2 V_b(Q+V_b t)$$

The shock wave which triggers a sensor is the one for which t is a minimum.

Differentiating equation (8) with respect to $\lambda$ and putting $dt/d\tau = 0$ for a minimum gives $$3AX^2 + 2BX + C = 0 \quad (9)$$

and the solution of equations (8) and (9) will give the required value of the time to the sensor.

Proceed as follows:
Multiply (g) by X/3 and subtract from (8)

$$(B - 2B/3)X^2 + (C - C/3)X + D = 0$$

or $$BX^2 + 2CX + 3D = 0 \quad (10)$$

Multiply (9) by B, (10) by 3A and subtract $$(6AC - 2B^2)X + (9AD - BC) = 0$$

whence $$X = \frac{(BC - 9AD)}{2(3AC - B^2)} \quad (11)$$

Then $$\left.\begin{array}{l} 3AX^2 + 2BX + C = 0 \\ X = \frac{(BC - 9AD)}{2(3AC - B^2)} \end{array}\right\} \quad (12)$$

From the above mathematical analysis it will be appreciated that when a conically expanding shock wave as generated by a supersonic projectile is detected by a plurality of spaced sensors, and the time of detection at each sensor is measured, assuming that a sufficient number of sensors is provided, a number of simultaneous equations may be solved which provides the co-ordinates of the hit position of the bullet as it passes through a predetermined target plane.

It has been proposed to provide an arrangement for determining the position that a bullet impinges on a target in which an array of transducers is provided beneath and slightly in front of the target to detect the conical pressure or shock wave, each transducer of the transducer array being associated with a timing device adapted to provide an indication of the precise instant at which the pressure or shock wave is detected by each transducer, a computer being provided to perform the necessary calculations to solve the simultaneous equations to provide an indication of the bullet hit position.

This invention also relates to such an arrangement, and in particular to a specific transducer array.

Referring to FIG. 2 of the accompanying drawings a rifle range in accordance with the invention comprises a plurality of firing points 1 intended to be occupied by trainee marksmen 2, and a corresponding number of targets 3 intended to be fired at by the trainee marksmen. The targets are shown in a single bank, but a plurality of banks of targets spaced at increasing distances from the firing point may be provided. Located in front of the targets is an earth bank 4 or other protective device and located behind the earth bank 4, and thus out of the line of sight of the trainee marksmen 2 is a separate transducer array 5 for each target the transducers being arranged at spaced positions adjacent the lower edge of the target and being adapted to sense the pressure or shock waves generated by bullets fired at the target. The transducer array 5 will be described in more detail hereinafter. The transducers of each array 5 are connected, by means of appropriate land lines 6 to a computer 7 or similar calculating device which is accommodated in a control room 8 utilised by the range controller. The computer is adapted to calculate the position of each round fired at each target 3 when the shock wave generated by the round is detected by the transducers, and the position of each bullet may be displayed on a visual display unit 9 in the control room and on a visual display unit 10 provided each firing point 1. Thus the trainee marksman may see where each particular round impinges on the target. If spectators 11 are to be present, a large visual display device 12 may be connected to the computer 7 to enable the spectators 10 to view the progress of the shooting. In addition, or as an alternative, to the provision of the display units, print out devices or paper punching devices 13 may be operated by the computer 7 to provide a printed indication of the point at which each bullet impinges upon the target 3, or the score achieved by each bullet or a corresponding punched paper output.

It will be appreciated that with a system of this type it is not necessary to use a rigid target, and the only requirement of the target is that the target should be visible to the trainee marksman to provide an aiming point. Thus it is not necessary to utilise personnel to repair targets or indicate the position at which individual rounds impinged upon the target. It will also be appreciated that since the transducers 5 are located behind the earth bank 4 the only possible way in which the transducers can be damaged as a result of firing is as a consequence of a ricochet, and such ricochet are very unusual. The probability of any transducer being damaged is extremely low. As will be explained in more detail hereinafter utilising a system of this type it is possible to obtain great accuracy and, in fact, with a target area of 6 ft. by 6 ft. it is possible to calculate the position of any bullet impinging on that target area with an accuracy of greater than $\frac{1}{4}$ inch. It is believed that if appropriate steps are taken this accuracy may be improved.

Now that the invention has been broadly described, the invention will be described in more detail.

FIG. 3 illustrates, in greater detail, one of the targets and transducer arrays corresponding to those shown in FIG. 2. In FIG. 3 the transducer array 5 is mounted on a standard moving target mechanism 14, which is well known and will not be described in specific detail. However, it is to be understood that the transducer array need not be physically mounted on the moving target mechanism but may be located in any convenient way adjacent or near the lowermost edge of the target 3.

The transducer array 5 comprises three transducers 15, 16, 17 which are arranged in a first horizontal row which is substantially parallel with the plane containing the target when in the erected or operative shooting position, the three transducers 15, 16, 17 being located beneath the bottom edge of the target and slightly in front of the target. A second row of three transducers 18, 19, 20 provided which is mounted directly in front of transducers 15, 16, 17 respectively the transducers thus being aligned with each other. The transducers are thus in two linear rows of three, the two rows being in a single horizontal plane. In alternative embodiments of the invention the plane containing the rows of transducers may be vertical or horizontal.

The transducers are mounted on support arms or rods 21 which are shown diagrammatically in the drawings. The precise nature of the transducers and the way in which they are mounted will be described hereinafter.

The support rods 21 are shown as being mounted on the moving target mechanism. A housing 22 may also be provided on the moving target mechanism. The housing 22 may contain a first device 22a which is adapted to measure the speed of sound in air in the region of the target. Since the speed of sound in air is dependent primarily upon the temperature of the air and the relative humidity of the air it is possible for the device merely to measure the temperature of the air and the relative humidity of the air to provide appropriate signals to the computer 7 to enable the speed of sound in air at the region of the target to be calculated by the computer 7. Alternatively the device may measure the speed of sound in air directly by generating a pulse of sound and measuring the time that it takes for the sound to traverse a known distance the sound being detected by appropriate transducer means at known positions. Again the appropriate information would be supplied to the computer 7 to enable the computer 7 to calculate the speed of sound in air.

The housing 22 may also support a second device which is a device 22b adapted to determine the effect of wind in the region of the target. Such a device may comprise means for transmitting a sound wave at a position which is subjected to wind, the transmitted sound wave being detected, for example by the transducers 15, 16 and 17, the time of detection of this transmitted pulse of sound by the various transducers being utilised by the computer 7 to calculate the effect of wind in the target region.

Figure 5:
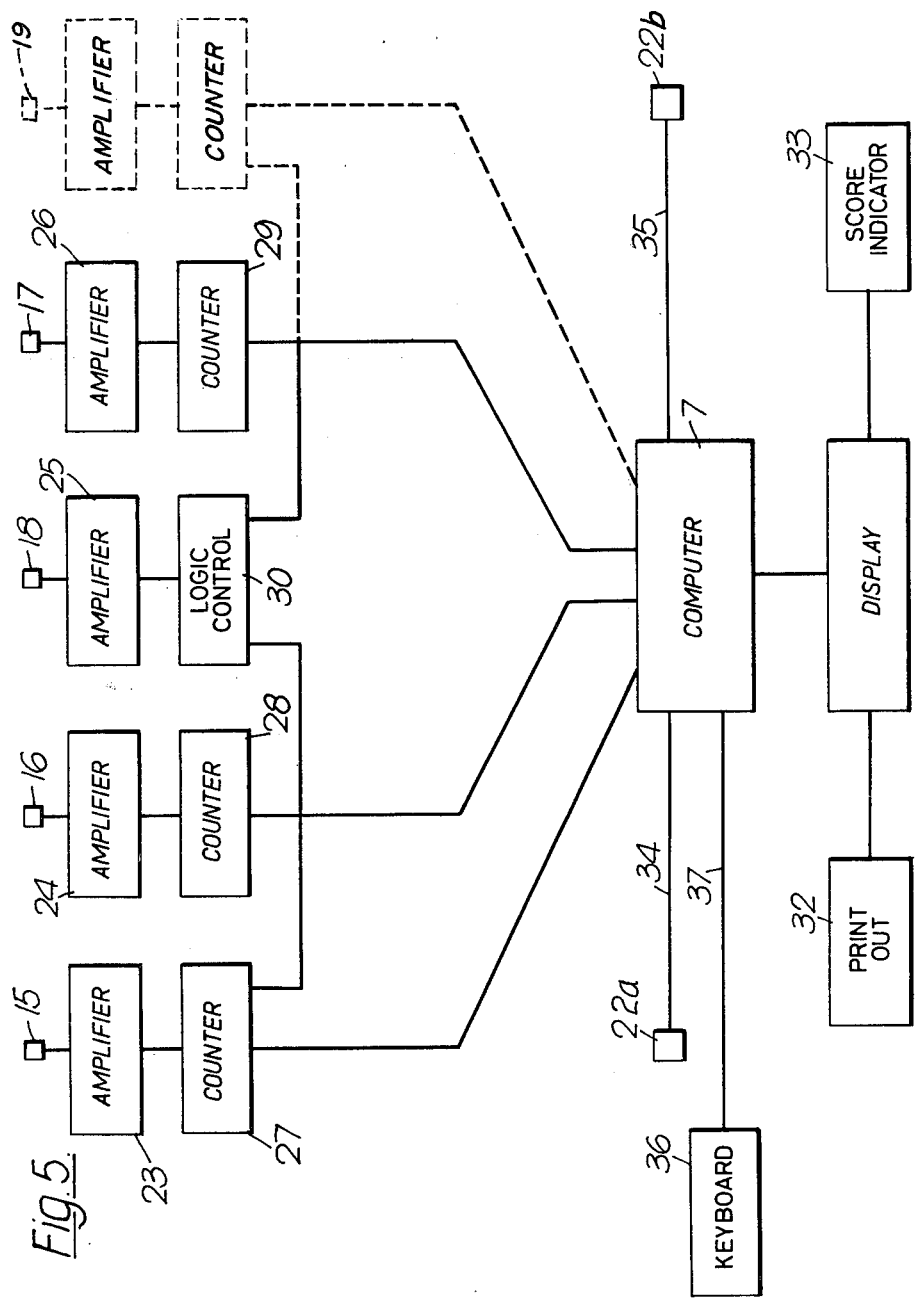
FIG. 5 is a block circuit diagram of part of the apparatus.

Referring to FIG. 5 each transducer 15-20 is connected to a respective amplifier only amplifiers 23-26 being shown, but corresponding amplifiers being associated with the remaining transducers. Counters 27, 28 and 29 are connected to the outputs of the amplifiers 23, 24 and 26 respectively and further counters will be associated with the remaining amplifiers. A logic control device 30 is connected to the output of the amplifier 25. The logic control device 30 is adapted to provide signals to each of the counters.

Each counter is a counter of the type 74191 as sold by Texas Instruments. It is anticipated that normally the transducer 18 will initially detect the conical shock or pressure wave of a bullet fired towards the target, and when such a shock wave is detected by the transducer 18, the logic control device 30 is activated, causing the counters to commence counting in a positive sense at a predetermined rate. When each counter receives a signal from the associated amplifier the counter will stop counting, and thus the count present on the counter will be indicative of the time difference between the instants of reception of the shock wave by the transducers 18 and 16 respectively, and further differences in counts between the counts stored on the various counters will be indicative of the time difference between the instants of reception of the shock wave by the various transducers 15, 16 and 17 of th transducer array 5.

The computer 7 is adapted to control a display 31 which may be any convenient type of display, for example, the small visual display unit 10 provided for each trainee marksman 10 the large visual display unit 12 provided for spectators 11, or a visual display unit 9 provided on the central control console and computer 7.

The computer 7 may also control a print-out device 32 and a score indicating device 33, the score indicator being adapted to calculate the score to be allotted to any particular shot fired at the target and to indicate that score. The devices 22a and 22b are connected to the computer by appropriate lines 34, 35 and a key board 36 may be provided connected to the computer by a line 37 to enable information to be supplied to the computer, for example, information concerning the type of ammunition being used or the identity of a particular marksman who is firing on a particular target.

It is to be understood that whilst the above description shows that a computer is provided which is located at a distance from the transducers it is possible to utilise a microprocessor within the housing 20 to calculate the position of a bullet generating the signals detected by the transducers, the micropressor being connected to an appropriate display device by an appropriate land line.

Figure 6:
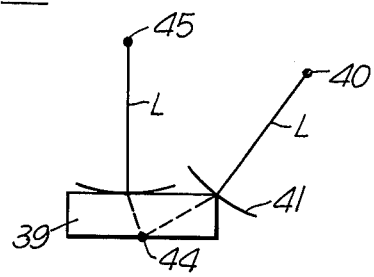
FIG. 6 is a diagrammatic view of part of one possible form of transducer.
Figure 7:
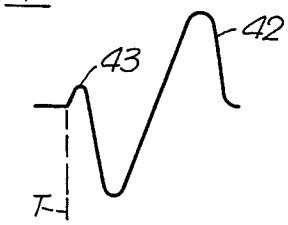
FIG. 7 is a graphical representation of a wave form as detected by the transducer of FIG. 6.

In utilising the present invention it is possible to utilise, as a transducer, merely a flat disc 39 of a piezo-electric material. Such a transducer may be located in a horizontal position as illustrated in FIG. 6. Such a transducer does possess several disadvantages. If a bullet 40 is fired to the right of the transducer the subsequent shock wave 41 will impinge on the edge or corner of the transducer 39, and the transducer will be compressed both in a vertical direction and in a horizontal direction. The resultant output of the transducer will have a wave form substantially as illustrated in FIG. 7, which is a negative going sinusoidal wave form 42 having a small positive "pip" 43 at the leading edge. It is desired to measure the time T illustrated on the wave form, and it is very difficult to detect this time T accurately since the amplitude of the "pip" 43 depends upon the precise position of a bullet, is difficult to distinguish from background noise, and can even be absent.

The computer is provided with information concerning the position of the transducer, this information being the precise position of the centre 44 of the transducer and the computer performs all calculations on the basis that the transducer is at this particular position, and that the output signal generated by the transducer is indicative of the instant at which the shock wave arrives at this particular position. The transducer, however, provides an output with a predetermined response time as soon as the shock wave impinges upon the transducer. If a bullet 45 passes vertically above the transducer 39 the shock wave impinges directly on the upper surface of the transducer, generating an appropriate output signal. Now it can be seen that the trajectory of the bullet 40 fired to the right of the transducer is further from the point 44 then the trajectory of the bullet 45 passing immediately over the transducer.

However, the distance between each of the trajectories of the bullets 40, 45 is equal to a distance L, and since the transducer provides an output as soon as the shock wave impinges on the transducer the times between the bullets passing and the output signal being generated are equal. Thus the output of the transducer would suggest that the trajectories of the bullets 40, 45 are equispaced from point 44, which is not correct. In other words a slight timing error will be generated and the computer will calculate the trajectory of the bullet passing to the right of the transducer to be closer to the point 44 than it is in reality.

Figure 8:
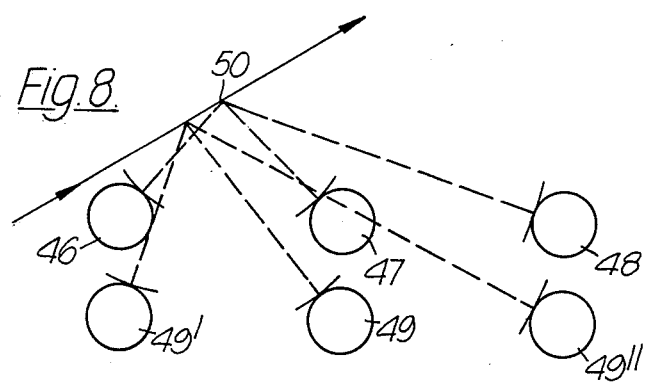
FIG. 8 illustrates a further alternative transducer configuration.

This particular disadvantage can be overcome merely by disposing the transducers in a vertical orientation so that the transducers are in the form of vertical discs 46,47,48,49,49',49" as shown in FIG. 8 the planar faces of which are directed towards the trainee marksman. Then, as a bullet 50 passes over the discs and the resultant shock wave is generated the shock wave will always impinge upon the periphery of each disc, and the point of impingement of the shock wave on each disc will be an equal distance from the centre or origin of the disc. Thus a constant timing error will be introduced into each signal generated by each transducer, and since it is only time differences that are used as a basis for the calculations this constant error will be cancelled out.

However, orientating the discs in a vertical position will not obviate the problem of the positive pip 43 at the beginning of the output signal 42, and thus, in the present invention, it is preferred to provide each transducer with a dome of a solid material having a convex surface exposed to the shock waves, the planar base of the dome being in intimate contact with the transducer material and being adapted to transmit shock waves from the atmosphere to the transducer. If a hemispherical dome is utilised, provided that the axis of the dome is pointing vertically upwards in front of the target, or is directed towards a trainee marksman, or is at an orientation between these two limiting orientations the shock waves generated by the projectiles fired at the target will always strike the periphery of the hemispherical dome tangentially, and shock waves will be transmitted radially through the dome directly to the centre of the transducer. Thus a constant timing error is introduced, this timing error being equal to the time taken for the shock wave to pass from the periphery of the hemispherical dome to the centre thereof, and as indicated above such a constant timing error will be of no consequence.

It will be appreciated that the hemispherical dome serves to prevent or minimise the generation of the positive going pip 43 at the beginning of the wave form generated by the transducer, and thus the output of the transducer now resembles more closely a sinusoidal wave form. However, it is important that the instant of commencement of this sinusoidal wave form be measured with great accuracy, and thus it is preferred to utilise a transducer that will have a very fast response, though not necessarily a large response. It is found that if the response times of a series of piezo-electric discs of different size are commenced, it is found that the response time is a function of the diameter of the disc, the smaller discs having a faster response time. However, it has been found that a response time of all discs with 5 mm diameter or smaller are substantially equal. It is to be noted, however, that the amplitude of the output of such a disc is proportional to its size, and it is for this reason that it is presently preferred to utilise a disc having a diameter of 5 mm, since such a size provides the fastest response time with the highest amplitude output signal. This size of disc is also preferred since the output of a transducer provided with such a disc has a frequency much higher than that of any noise or interference likely to be encountered and thus such noise can be filtered out. However, it is envisaged that smaller diameter discs may be preferred for reasons of improved accuracy.

Figure 9:
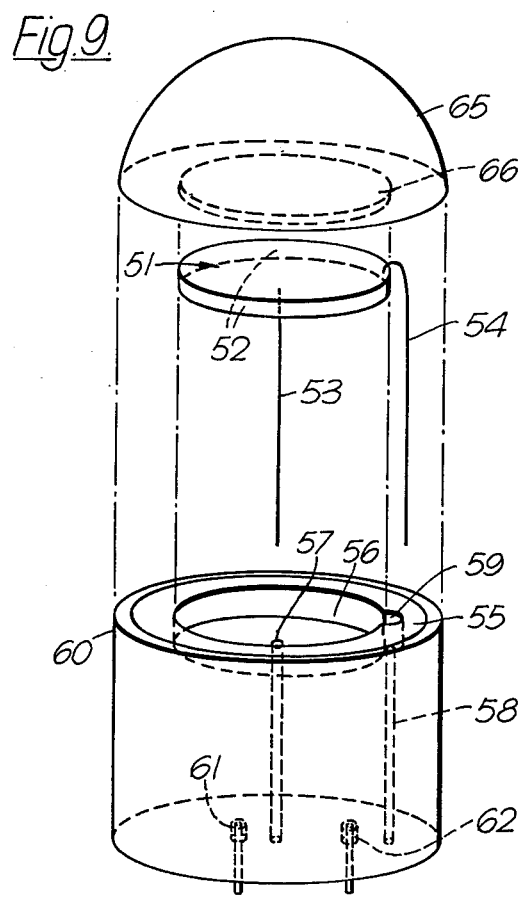
FIG. 9 is an exploded view of preferred embodiment of transducer.
Figure 10:
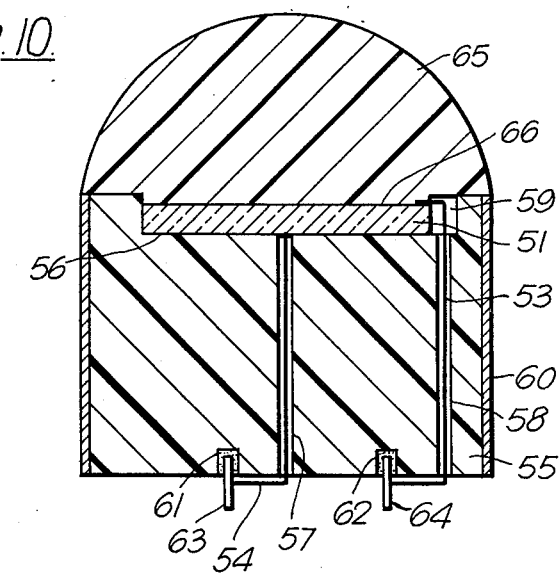
FIG. 10 is a sectional view of the transducer of FIG. 9.

With reference to FIGS. 9 and 10 of the accompanying drawings a preferred transducer for use in connection with the present invention comprises a transducer element consisting of a disc 51 of piezo-electric material such as, for example, lead zirconium titanate. The disc 51 is 1 mm thick and 5 mm in diameter. The opposed planar faces of the disc 51 are provided with a coating of a conductive material 52, such as silver which may be provided in any convenient way, such as by vacuum deposition. Two electrically conductive wires 53, 54, for example, of copper or gold, are connected to the centre of the lower surface of the disc and to the periphery of the upper surface of the disc by soldering or by ultrasonic bonding. The disc 52 is then firmly mounted in a housing which comprises a cylindrical member 55 having a 5 mm diameter recess 56 in one end face, the recess 56 having a depth of 1.5 mm, the recess 56 also being associated with an axial bore 57 extending through the member 55 to accommodate the wire 53 provided on the lower surface of the piezo-electric member. A second bore 58, parallel to bore 57 is formed in the periphery of the member 55, this bore 58 being adapted to accommodate the wire 54 and terminating in an open recess 59 adjacent the main recess 56. The member 55 may be formed of Tufnol, which is a phenolic resin bonded fabric, this material being readily obtainable in cylindrical form, the housing being machined from the material, although alternatively the housing may be formed of a two part phenolic resin such as that sold under the Trade Mark "Araldite", the resin being retained in a cylindrical aluminium case 60, and subsequently being machined. If this particular expedient is utilised the aluminium case 60 may be earthed to provide a Faraday cage to minimise noise. The piezo-electric material and wires are bonded in to the member 55 with an adhesive such as Araldite or a cyano acrylic impact adhesive. Two small bores 61, 62 are formed in the lower surface of the member 55, and electrically conducting pins 62, 63 are mounted in the bores. The wires 53, 54 protruding from the lower ends of the bores 57, 58 are soldered to the pins, and an adhesive or other suitable setting material is utilised to retain all the elements in position and also to secure a solid hemispherical dome 65 to the transducer. The dome may be machined from aluminium or cast from a setting resin material such as that sold under the Trade Mark "Araldite". The dome 65 has an outer diameter of 8 mm, which is equal to the diameter of the housing and a centrally disposed projection 66 on the base this projection being adapted to contact the piezo-electric disc 51 and having the same diameter as the disc 51. Alternatively the dome and the member 55 may be cast as a single integral unit.

The pins 63, 64 protruding from the base of the holder may be connected to a co-axial cable, and the entire connection may be encapsulated in soft rubber. The coaxial cable may be short (i.e. up to 1 meter in length) and is connected to a suitable amplifier adapted to amplify the output signal generated by the transducer. In an alternative embodiment of the invention the pins provided on the holder are connected directly to a printed circuit board upon which is mounted the amplifier, the printed circuit board being potted on to the base of the housing.

The housing coupled with its associated transducer, is mounted, as generally described above, in front of the target, and it is important that both the housing and any cable emerging from the housing be acoustically decoupled from any support or any other rigid structure that could possible receive the shock wave detected by the transducer before the shock wave is received by the hemispherical dome provided on top of the transducer. Thus, if the transducers are mounted on a rigid horizontal framework it is important that the transducers are acoustically decoupled from such a framework. The transducers may be mounted on a block of any suitable acoustic de-coupling medium, such as an expanded polymer foam, or a combination of polymer foam and metal plate. The most preferred material is closed cell foam polyethylene, this material being sold under the Trade Mark "Plastizote" by Bakelite Xylonite Limited. Of course, many other acoustic de-coupling materials may be used such as glass fibre cloth or mineral wool.

Figure 11:
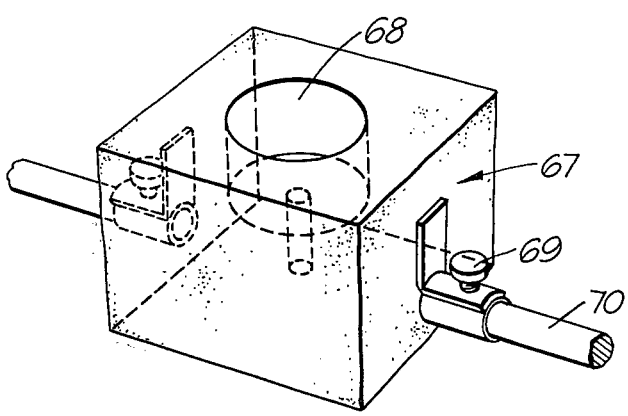
FIG. 11 is a housing for accommodating the transducer of FIGS. 9 and 10.

The transducer may be mounted by taking a block 67 of acoustically coupling medium as illustrated in FIG. 11, forming a hole or recess 68 within the block of material dimensioned to accommodate the transducer and holder and inserting the housing into the recess. The entire block may then be clamped in any convenient way, such as by clamps 69 to a suitable framework or support 70, these items being illustrated schematically.

When the transducers have been positioned relative to the target it is necessary for information concerning the precise position of each transducer to be supplied to the computer together with information concerning the position of each target relative to the transducers. The appropriate distances may be measured carefully and the appropriate information may be fed to the transducer, or other methods may be used for supplying information to the computer. For example, instead of measuring the distance between the transducers with a ruler or the like, a rod of metal may be located so that the rod of metal is touching each of the transducers, and an ultrasonic pulse may be propagated along the rod of metal, the time of arrival of the pulse at each transducer being measured and recorded by the computer. The computer is provided with the speed of the ultrasonic pulse wave along the metallic rod, and consequently the computer is able to calculate, with a high degree of accuracy, the precise position of each transducer.

It will be appreciated that when bullets are fired towards the targets the position of the bullet is measured relative to the transducer, and it is this position that is eventually displayed by the computer. Thus it is important that the computer be provided with precise information concerning the position of the target relative to the transducers.

The amplitude of the shock waves generated by each of the transducers as described above will depend upon the velocity of the bullet, the precise nature of the bullet, the distance of the bullet from the transducer, and many other variable factors.

Figure 12:
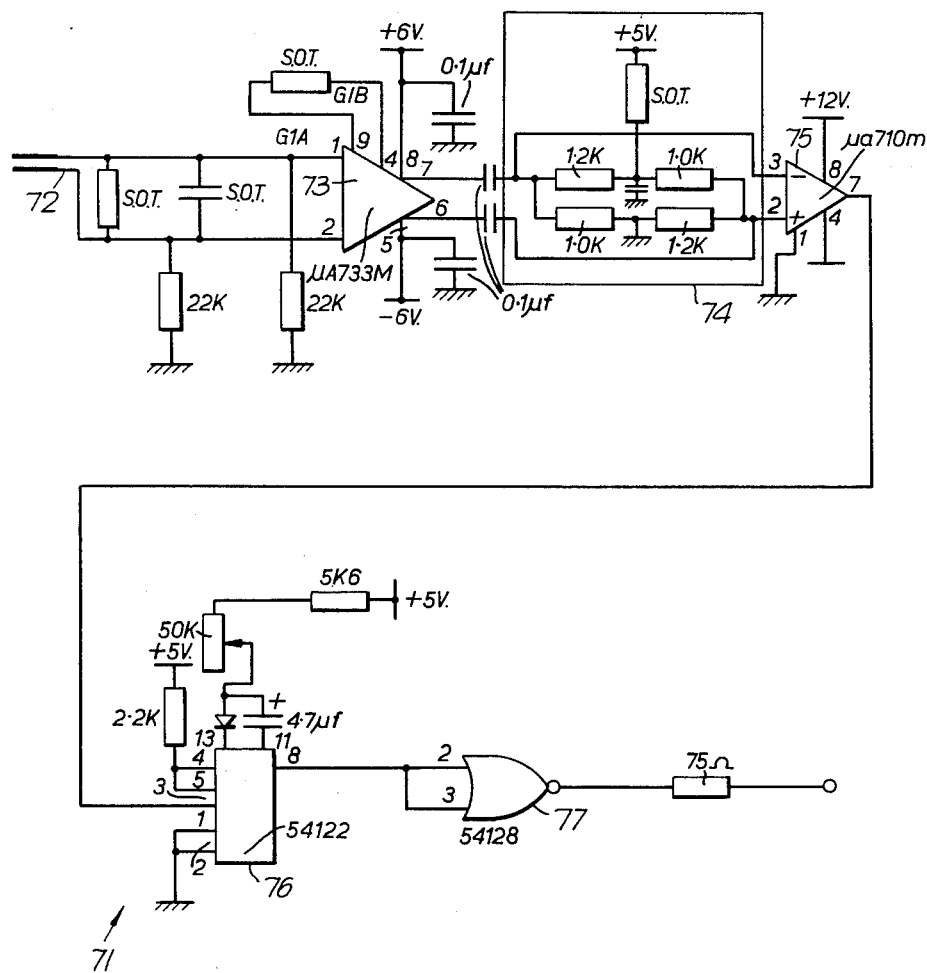
FIG. 12 is a circuit diagram of an amplifier used in conjunction with the transducer.

From this signal it is necessary to obtain a precise signal which can be utilised to operate the means which measure the time at which the shock wave was detected by the transducer, and thus, effectively, it is desired to change the analog signal produced by the transducer into a digital signal. Thus the signal is fed to an amplifier which provides a digital signal having a fast leading edge, the amplifier being triggered by a shock wave but not triggered by any noise. The preferred amplifier 72 is shown in FIG. 12 of the accompanying drawings, and it is to be noted that the signal is supplied to the amplifier along the coaxial cable 72, the two cores of the coaxial cable being fed past various biasing resistors to the input of a differential amplifier 73. The output of the differential amplifier 73 is AC coupled to a trigger threshold comparator 74 in which the signal is compared with a predetermined reference signal to prevent the entire apparatus being triggered by noise rather than a shock wave. The trigger threshold comparator 74 may be adjusted to adjust the sensitivity of the device. The output of the comparator is amplified with a linear amplifier arrangement 75, 76, 77 and an amplified signal is provided at output 78.

The component references shown in FIG. 12 of the accompanying drawings identify the components utilised in the preferred embodiment of the invention, these components being military grade components available from Texas Instruments.

The output of the amplifier 71 can be considered to be a digital signal.

Mention has been made above of a trigger threshold comparator 74 to prevent the apparatus being triggered by noise rather than a shock wave. The trigger threshold comparator 74 is adjusted so that an output signal is generated when a pressure or shock wave generated by a supersonic projectile is detected, but so that an output signal is not generated when the transducer receives noise, or noise is generated in the transducer, for example as a result of rain drops or the like falling on the transducer.

Whilst FIG. 10 illustrates an arrangement in which a relatively large projection 66 on the base of the dome 65 engages the disc 51 it may be preferred to utilise a projection 66 having a very small diameter to contact the disc 51, the projection 66 being at the centre of curvature of the dome shaped member 65.

Figure 13:
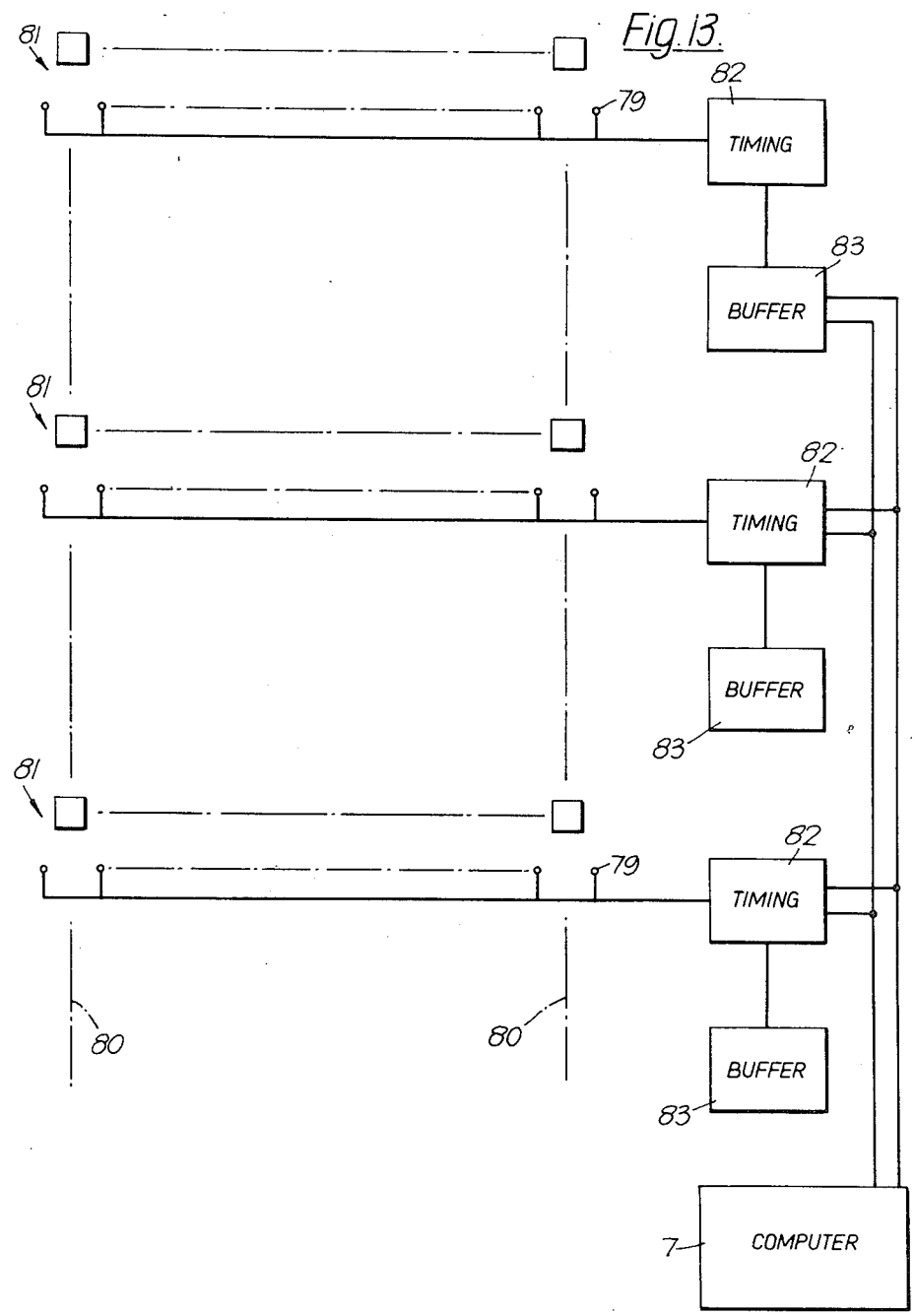
FIG. 13 is a block circuit diagram of the transducers of various buffers and the computer.

FIG. 13 of the accompanying drawings illustrates the arrangement of transducers 79 on a range having a plurality of lanes 80 and a plurality of target banks 81. The transducers 79 of each target bank 81 are connected to a timing arrangement 82 (which will be described hereinafter) and the output of each timing arrangement is fed to a buffer 83. Thus, referring to FIG. 16 of the accompanying drawings there are three banks of targets 81 which provide signals from the transducers to the three timing arrangements 82, and thus to three buffers 83. The buffers are interrogated sequentially by the computer 7, and when any information is available at the output of a buffer 83, then that information is transferred into the computer 7, and subsequently the buffer is cleared. It is to be appreciated that in utilising an arrangement in which information from each bank of transducers is stored in a buffer, and then the buffers are interrogated by the computer the amount of wiring needed on the range is minimised, since otherwise each transducer would need to be individually connected to the computer.

Figure 14:
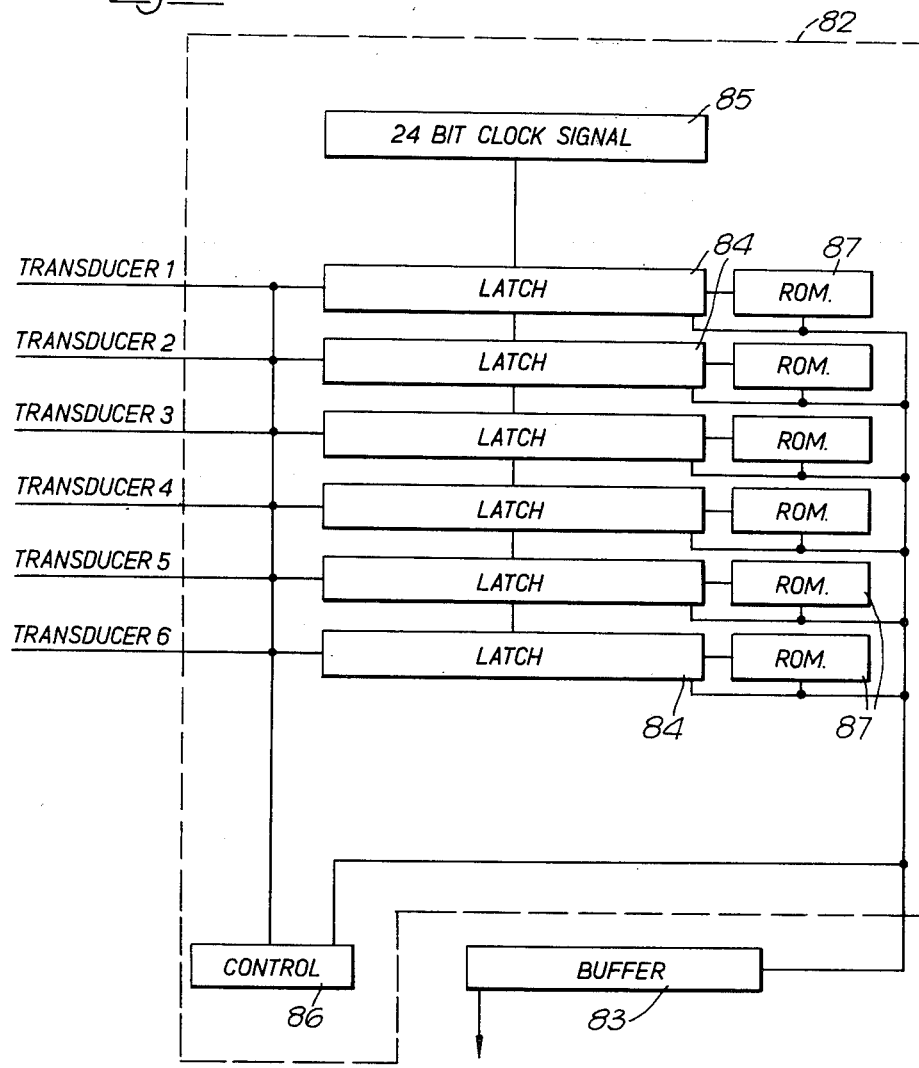
FIG. 14 is a block diagram of the timing circuit shown in FIG. 13.

Referring to FIG. 14 each timing arrangement 82 comprises an arrangement of tristate latches 84, each latch being connected to the output of the amplifier 71 associated with an individual transducer. Each latch 84 may comprise a latch as sold by Texas Instruments under the reference number 74363. Each of the tristate latches 84 is connected to an output of a 24 bit clock signal generator 85, this signal generator generating successive signals indicative of the precise time. A new signal is generated every ten nano seconds. The arrangement is such that when the digital signal is provided from the amplifier 71 associated with a transducer to a latch 84 the latch will record the 24 bit clock signal present on the output of the 24 bit clock signal generator 85 at that instant. The digital signal from the amplifier 71 is also fed, simultaneously, to a control device 86 which subsequently causes the signal recorded on the latch 84, together with a signal permanently recorded on a read only memory 87 associated with the latch, to be transferred to the buffer 83. The signal stored on the read only memory 87 is a signal representative of the transducer associated with that particular latch 84. The buffer 83 is a "first in-first out" type device and acts as a temporary store for information. The information stored in the buffer 83 comprises the signal temporarily stored on the latch 84, and the signal permanently stored in the associated read only memory 87. Once this information has been accepted by the buffer 83 a further signal is sent to the latch 84 and the latch then clears and is ready to store another signal from the clock signal generator 85 on receipt of a further shock wave from the associated transducer. Thus, the buffer 83 will store a large number of separate items of information, each item of information comprising a signal representative of a particular transducer and a signal representative of the time of receipt of a shock wave by that particular transducer. Of course, if two successive shock waves are detected by the same transducer, then two signals will be temporarily stored in the buffer comprising the same signal representative of that transducer, but different signals representative of the time of detection of a shock wave by that transducer.

Figure 15:
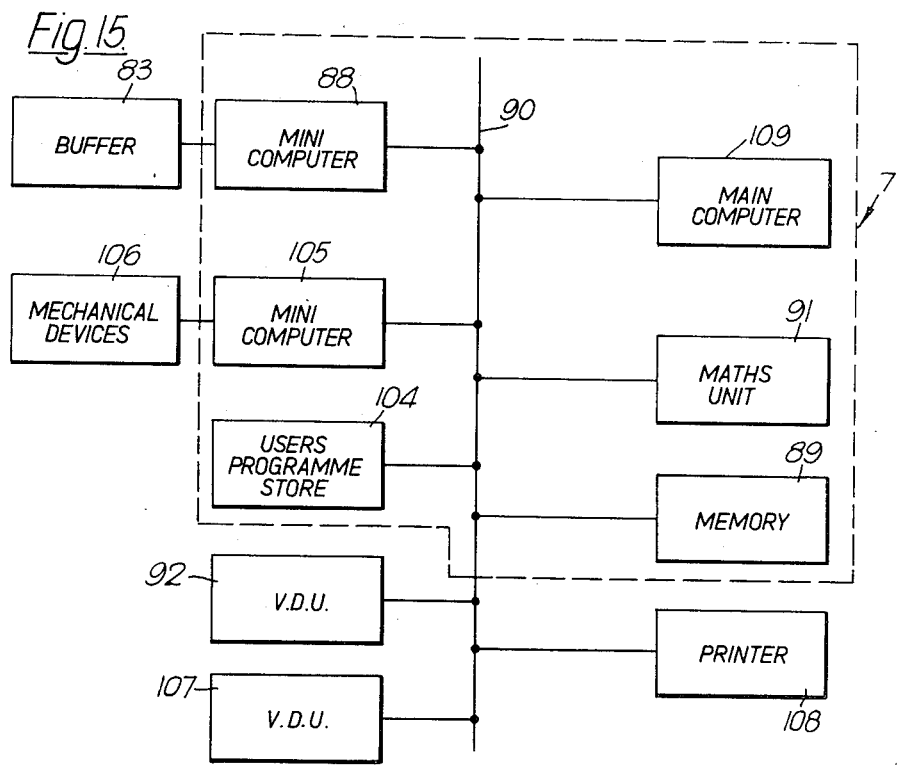
FIG. 15 is a block diagram of one possible form of computer organisation.

When a signal stored in the buffer is available in the output of the buffer 83 a signal is forwarded to the computer 7, and the computer 7 then interrogates each of the buffers, accepting information from the buffer 83 that has information present on its output. Information from the buffer 83 is fed to a first mini-computer 88 and is also fed to a memory 89 present in the computer assembly. These components, and other components present in the computer assembly, are connected together by a maxibus 90, which is shown in FIG. 15 in the accompanying drawings, and the arrangement operates in real time, that is to say, time not shared between the various components, but the components operate independently of each other, and the components may thus operate simultaneously. The mini-computer 88, which may be a Texas Instruments TMS 9900 computer associated with a local memory comprising an Intel 2102 memory, initially scans the data received and feeds the signals to a purpose built pre-programmed computer 91 or PROM (programmed readout memory) which operates as a maths unit to conduct a predetermined mathematical operation on the input data and to provide an output signal representative of the position of the trajectory of the projectile.

It will be appreciated that the programming of such a device is inherent in the hardware of the device, and thus no software programme is necessary. Thus the device can operate at a very high speed, and such an approach is feasible since the unit will only be required to perform one mathematical function. However, it is to be appreciated that a programmed computer could be used, provided that the programmed computer was able to operate with sufficient speed. When the maths unit 89 has calculated the position of the trajectory, that information is fed to memory 89, and from there to a visual display assembly 92.

Figure 16:
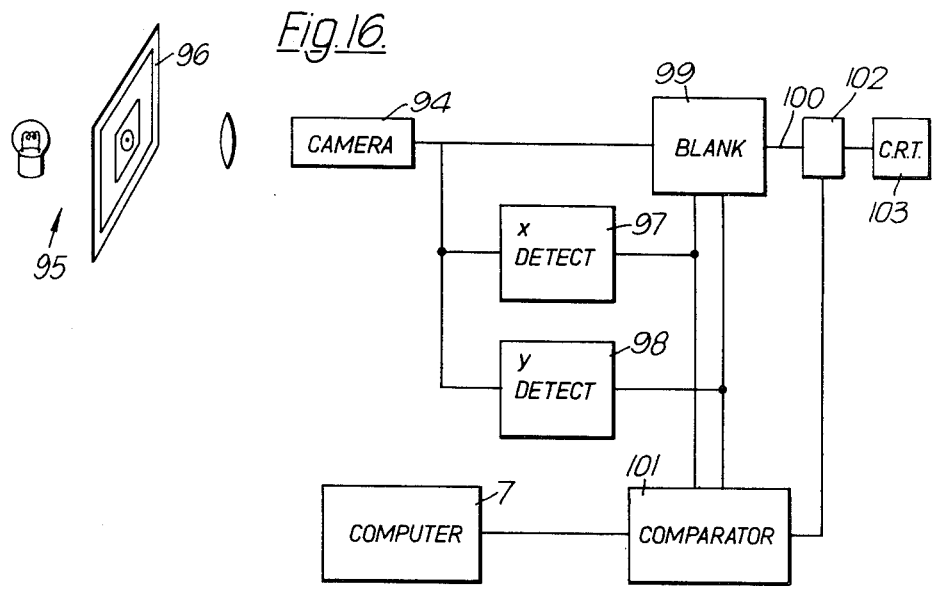
FIG. 16 is a block diagram of a further part of the apparatus.

The visual display assembly 92 comprises means for generating a signal which, when fed to a cathode ray tube, causes that cathode ray tube to display a representation of a target. Referring to FIG. 16 the preferred means for generating such a signal comprises a closed circuit television camera 94 associated with means 95 for projecting an image on a photographic slide 96 into the camera. The camera 94 operates in the usual way and thus produces a video signal representative of the image on the slide 96. Also present on the slide 96 are various marks or lines defining X and Y axes, the position of the target being known with regard to these axes. Part of the video signal from the camera is fed to two separate detector circuits 97, 98, which are adapted to detect the position of the beam scanning the target in the camera at any instant, the detector circuits 97, 98 being connected to a blanking device 99 adapted to blank out that part of the video signal which relates to the marks defining the axes. Thus the result of the video signal on line 100 comprises only a part of the video signal generated by the camera 94, that being the part of the signal representative of the image of the target. The signals generated by the X detector and Y detector are also fed to a separate comparator 101, this comparator being provided with information, from the computer 7, comprising the precise position of each projectile detected by the system. The comparator 101 compares the position of the projectile with the signals from the X detector and Y detector, and when the signals correspond, that is to say when the beam in the camera 94 is directed at the area of the image projected into the camera 94 corresponding to the area of the target on the range that has been impinged by the projectile, then the comparator provides an output signal which is fed to an exclusive OR gate 102. The output of the blank 99 is fed to a cathode ray tube 103 via the exclusive OR gate 102, and it will be appreciated that the cathode ray tube will display an image of the target derived by the camera 94 from the slide 96, and will also display, on that image, areas where the colour of the image has been reversed indicative of the points of the target impinged upon by the bullets or projectiles fired on the range. Of course, it is assumed that the bullet or projectile will impinge upon the target at the position calculated from the information derived by the transducers.

One visual display unit 92 may be provided for a range controller, and the range controller may select any target of the plurality of targets on the range as being a target of interest, and then the visual display unit will display a representation of that particular target and a representation of the positions at which projectiles fired at that target have impinged on the target or passed by the target. A plurality of such visual display units may be provided for a plurality of range controllers, and indeed, as envisaged in the opening paragraphs of this description an individual display unit may be provided for each trainee marksman so that the marksman may immediately see where each bullet goes.

It is envisaged that in a range in accordance with the invention the individual targets will each be associated with a mechanism for raising the target to an exposed position and lowering the target to a concealed position. These mechanisms may be controlled by the computer assembly, and the computer assembly may include a user's programme store 104 on which a predetermined programme of movements of the targets may be stored, the targets executing these predetermined movements when the stored programme is activated. A second mini-computer 105 which again may be a Texas TMS 9900 computer may be provided connected to the mechanical devices 106 which are provided to move the targets, this computer recording the position of each particular target and checking the correct functioning of each particular target. A further visual display unit 107 may be provided in such an embodiment of the invention, this display unit displaying images depicting the various targets present on the range, the display present on the visual display unit at any particular time being indicative of the condition of each target, that is to say, whether the target is in the raised position or in the lowered position, and also indicating the number of hits that have been scored on any particular target. It is envisaged that this particular visual display unit will be provided for a supervisory range controller who may, from considering the visual display unit, assess the precise condition of each target present on the range. This visual display unit is also adapted to indicate a malfunction of any particular target.

A printer 108 is also associated with the computer assembly, the printer being operable to provide print-outs of any of the information present in the store. A paper puncher may also be provided.

The main computer 109 which provides a controlling function is preferably a computer sold by Computer Automation (Naked Mini Division) of Irvine, California, as computer OS 1 4/10, the users programme store 104 is preferably a floppy disc sub-system model 18566-XX as sold by Computer Automation, the main memory 89 is preferably a core memory of up to 32 K words as sold by Computer Automation, and the preferred printer 108 is a Centronix 306, also available from Computer Automation.

It will be appreciated that many modifications may be made, and the computer may be provided with facilities for calculating a score attributable to any particular projectile, this score being displayed on the appropriate visual display unit.

The targets utilised in a range in accordance with the present invention may be static targets, may be targets that rise and fall in response to command signals as shown in FIG. 1, or may merely be sprays of water or the like with visual images representative of the targets projected on them. If the targets are of the type that rise and fall, the targets may be controlled by land line, as described above, although the targets may be controlled by radio signals. The computer may be operated to cause a target to fall briefly whenever the target is actually hit by a trainee marksman. Furthermore, whilst the invention has been described with reference specifically to a fixed rifle range, it is to be appreciated that the invention may be utilised in a range where targets move along on trolleys, the transducers also being mounted on the trolleys in a fixed position relative to the targets.

When a range as described above is utilised for training a large number of marksmen the computer which is located at a central control console may perform many functions and the precise functions performed by the computer may be controlled by various push buttons or the like provided on the control console.

Initially the computer may be adapted to calculate the position of each round fired at each target and to provide signals to visual display units provided adjacent each trainee marksman so that each of the visual display units displays a representation of the target at which the trainee marksman is aiming, and also provides an indication of the points at which the trainee marksman has hit the target in any particular firing session. Thus, if a trainee marksman is to fire ten rounds at the target, as the rounds are successively fired at the target so the position of impact of the rounds on the target may be displayed on the appropriate visual display unit.

Of course, near-misses can also be displayed upon the visual display unit, since such near-misses will be detected by the transducers. At the end of a shooting session if the marksman has been reasonably accurate in his shooting there should be ten points marked on the representation of the target, indicating precisely where the rounds have hit the target. It is possible that the various points displayed on the display unit may be associated with numbers indicating the precise order in which the rounds were fired at the target, thus permitting the marksman to assess whether his accuracy was improving or not during the shooting session.

The computer may also calculate for each target for each shooting session in the overall dimension of the "Group" as fired by the training marksman. These figures may also be displayed on the individual display unit 9 provided for each trainee marksman. Alternatively, the number of "hits" and the number of "misses" may be recorded and displayed, or the score obtained by the marksman may be displayed.

It is envisaged that the computer 7 may be programmed to draw the attention of the range controller to any trainee marksman who is firing very inaccurately to enable the range controller to provide that trainee marksman with instructions or advice. The central control console is provided with a display device 8 enabling the trainer instantly to view a representation of any one of the targets, this representation corresponding precisely with the representation shown on the visual display of the appropriate trainee marksman. The trainer may monitor the progress of each trainee marksman.

The printer 13 may merely print the score and grouping obtained by each of the trainee marksman during a shooting session, or the printers may be operated to provided a print-out representation of any or all of the targets including representation of the points at which each of the targets has been hit by bullets. Such a print-out may constitute a permanent record of the shooting of any particular marksman.

The targets 3 utilised with the present invention may be static targets, and it will be appreciated that since the targets only function as an aiming mark it will not be necessary to replace any target until the target is virtually totally destroyed. It will also be appreciated that the invention may be used with advantage in connection with targets that can be moved from a concealed position to an exposed or firing position, and vice-versa. Targets of this type are illustrated in FIG. 1 of the accompanying drawings. The invention may also be used in connection with targets mounted on trollies for movement along a predetermined track, the transducers also being mounted directly or indirectly on the trolley for movement with the target. Of course, the invention may be used in conjunction with many facilities, such as lights to illuminate the target to permit shooting to be conducted after dark, and means on or adjacent the target to simulate retaliatory fire. Such means may be controlled by the computer to be operated in response to a shot fired at the target but which is a near miss. Many further possibilities will suggest themselves to those skilled in the art.

One computer program proposed for use in carrying out the invention is set out below. The progamme is provided with facilities for checking the accuracy of the arrangement, the theodolite angles being measurements of the precise position of the point at which a bullet impinges on the target The program relates to an arrangement in which there is independent measurement of the speed of sound.

We claim:
1. Apparatus for determining the location at which the trajectory of a supersonic projectile passes through a predetermined target area situated relative to a predetermined target, comprising:
   a plurality of transducers located at respective spaced positions in two substantially linear rows, said rows being generally coparallel and spaced apart in a common plane which is generally perpendicular to and located adjacent a single edge of the target area, each said row comprising at least three said transducers, and each said transducer being operative to produce an output signal in response to detection of an airborne shock or pressure wave generated by the supersonic projectile;
   individual threshold circuit means coupled to each transducer and responsive to said output signal for providing a digital signal when said output signal exceeds a predetermined threshold, the digital signal having a leading edge representing a time of detection of the shock or pressure wave by the associated transducer; and
   digital processing means, provided with data representing the respective positions of the transducers and data relating to the speed of sound in air, and operative for
      (1) measuring time differences between the leading edge of the digital signal associated with one of the transducers and the respective leading edges of the digital signals associated with each of the remainder of the transducers,
      (2) calculating, from said measured time differences and from the data representing the transducer positions and the data relating to the speed of sound in air, the location at which the projectile trajectory passes through the target area and the velocity vector of the projectile at said location, and
      (3) providing an indication of said calculated location,
   whereby said location at which the projectile trajectory passes through the predetermined target area is determined by solving for such unknowns as the supersonic velocity of the projectile and the velocity vector thereof.

2. The apparatus of claim 1, wherein the transducers are evenly spaced along said substantially linear rows.

3. The apparatus of claim 2, wherein each transducer of one said row is aligned in said common plane in a direction generally perpendicular to said rows with a respective transducer of the other of said rows.

4. The apparatus of claim 1, wherein said common plane is horizontal.

5. The apparatus of claim 1, wherein said common plane is inclined.

6. The apparatus of claim 4 or claim 5, wherein said common plane is located adjacent a lower side edge of the predetermined target area, further comprising means for shielding said transducers from impact thereon by said projectile.

7. The apparatus of claim 1, wherein said common plane is vertical.

8. The apparatus of claim 1, further comprising means for determining and providing to said digital processing means data representing the speed of sound in ambient air in the region of the target area.

9. The apparatus of claim 8, wherein said speed of sound determining means comprises means for generating a pulse of sound and means for measuring the time taken for the pulse of sound to traverse a known distance.

10. The apparatus of claim 8, wherein said speed of sound determining means comprises means for measuring the temperature and relative humidity of the air in the region of the target area.

11. The apparatus of claim 1, further comprising means for measuring and providing to said digital processing means data relating to wind velocity and direction in the region of the target area, said digital processing means being further operative to employ said data relating to wind velocity and direction in calculating said location and said projectile velocity vector.

12. The apparatus of claim 11, wherein said wind velocity and direction measuring means comprises a source of sound, and one or more transducers for detecting sound from said source and coupled to provide to said digital processing means said data relating to wind velocity and direction.

13. The apparatus of claim 1, wherein each transducer comprises a piezo-electric member, and a solid member of rigid material having a base portion in firm contact with the piezo-electric member and a convex surface exposed to the airborne shock or pressure wave, said member of rigid material transmitting the shock or pressure wave to said piezo-electric member.

14. The apparatus of claim 13, wherein said convex surface is hemispherical.

15. The apparatus of claim 13, wherein said piezo-electric member is disc-shaped and is provided with conductive coatings on two opposing faces thereof, each said transducer further including respective conducting wires connected to said coatings and a member of insulating material having a recess to accommodate said disc and channels accommodating said conductive wires.

* * * * *

CERTIFICATE OF CORRECTION

Patent No. 4,261,579    Dated April 14, 1981

Inventor(s) Bowyer et al.

It is certified that error appears in the above-identified patent and that said Letters Patent are hereby corrected as shown below:

Column 4, line 27, "facilitae" should be --facilitate--;
    line 41, "to" should be --be--.

Column 5, line 21, " $\delta t = 0/\delta\lambda$ " should be -- $\frac{\partial t}{\partial \lambda} = 0$ --;
    line 32, there should be a space between " $\gamma$ " and "so".

Column 6, lines 51, 59 and 63, "$\vee$" should be --V--.

Column 7, line 18, the term -- $2\lambda^2 t^2$ -- should be appended at the end of the formula; the term " $2\gamma^2 \lambda^2$ " should be deleted from line 19; line 34, "U" should be --u--.

Column 8, line 17, " $\frac{dt}{dT}$ " should be -- $\frac{dt}{d\lambda}$ --.

Column 9, "ricochet" (second occurrence) should be --ricochets--.

Column 10, line 10, --is-- should be inserted before "provided".

Column 11, line 9, "th" should be --the--.

Column 14, line 13, "possible" should be --possibly--.

Column 15, line 7, "72" should be --71--.

UNITED STATES PATENT OFFICE
CERTIFICATE OF CORRECTION

Patent No. 4,261,579  Dated April 14, 1981

Inventor(s) Bowyer et al.

It is certified that error appears in the above-identified patent and that said Letters Patent are hereby corrected as shown below:

Column 4, line 56 "$(1-\lambda t)$" should be --$(1-\lambda)t$--;
line 64 "C-R" should be -- $|C-R|$ --

Column 6, line 14, "again" should be deleted; line 43 the symbol "∴" should be changed to --where--; line 67, "S" should be lower case, i.e., --s--.

Column 7, lines 5 and 7, the "S" in the term "$e^{KS}$" should be lower case, i.e. --s--; line 7, "K(A-P)" should be --$K|A-P|$--; in lines 12, 19 and 29, "log" should be --ln--; line 29, "=" should be --$\approx$--; lines 40 and 45, "$Iu^2$" should be --$I\mu^2$--; line 47, "$\frac{u^4}{4K^2}$" should be --$\frac{\mu^4}{4K^2}$-- and "$\frac{u^2}{2K}$" should be --$\frac{\mu^2}{2K}$--; line 50, "$\frac{Iu^2}{2K}$" should be --$\frac{I\mu^2}{2K}$--; line 58, "$\mu$" should be --u--; line 63, there should be a minus sign, i.e. -- − -- before "2I".

Column 8, line 5, "$\mu$" should be --u--; line 7 "$(V_b(Q+V_b t)$" should be --$(V_b \cdot (Q+V_b t))$--; line 10, a --t-- should be appended to the formula; line 24, "(g)" should be --(9)--.

UNITED STATES PATENT OFFICE
CERTIFICATE OF CORRECTION

Patent No. 4,261,579   Dated April 14, 1981

Inventor(s) Bowyer, et al.

It is certified that error appears in the above-identified patent and that said Letters Patent are hereby corrected as shown below:

Column 11, line 13, "10" should be --2--.

Column 12, line 1, "then" should be --than--;
line 63, "commenced" should be --compared--.

Column 14, word bridging lines 42 and 43, "transducer" should be --computer--.

Column 16, line 59, "programmed readout" should be --programmable read-only--.

Column 18, line 50, "Fig. 1" should be --Fig. 2--.

UNITED STATES PATENT AND TRADEMARK OFFICE
CERTIFICATE OF CORRECTION

PATENT NO. : 4,261,579
DATED : April 14, 1981
INVENTOR(S) : William H. Bowyer

It is certified that error appears in the above—identified patent and that said Letters Patent is hereby corrected as shown below:

Column 19, line 26, "in" should be deleted;

line 60, "Fig. 1" should be -- Fig. 2 --.

Signed and Sealed this

Twentieth Day of July 1982

[SEAL]

Attest:

GERALD J. MOSSINGHOFF

Attesting Officer    Commissioner of Patents and Trademarks